Figure 3:
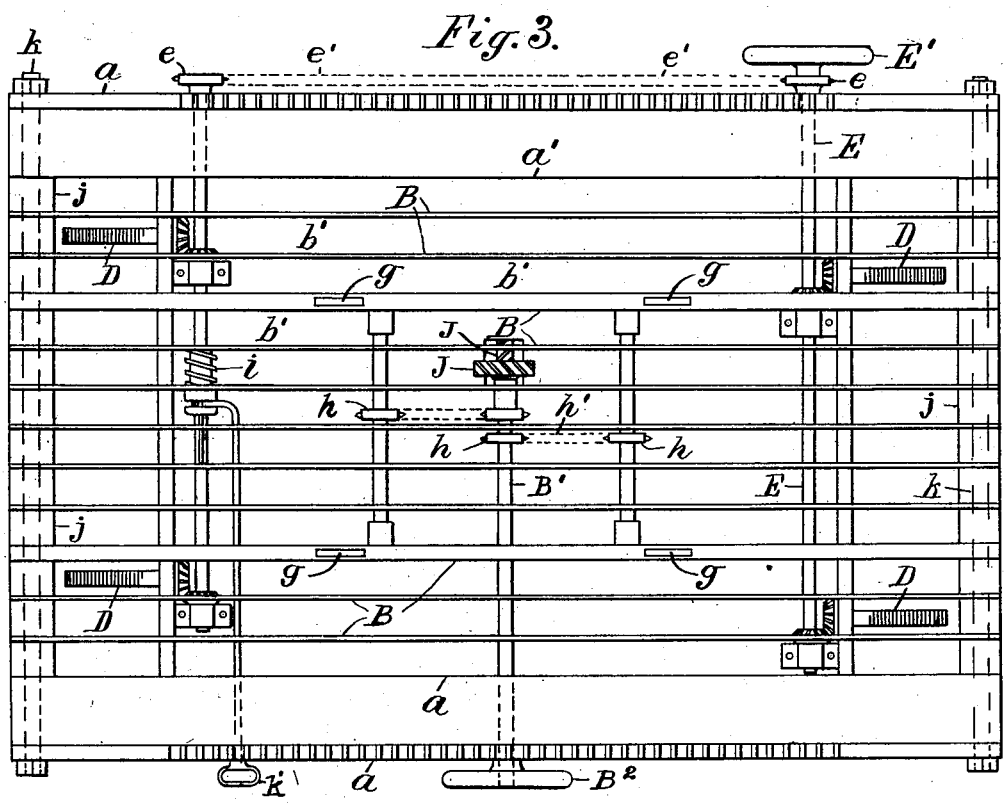

No. 734,216. PATENTED JULY 21, 1903.
L. R. BLACKMORE.
APPARATUS FOR MOLDING GLASS TILES.
APPLICATION FILED MAR. 16, 1903.
NO MODEL. 3 SHEETS—SHEET 1.
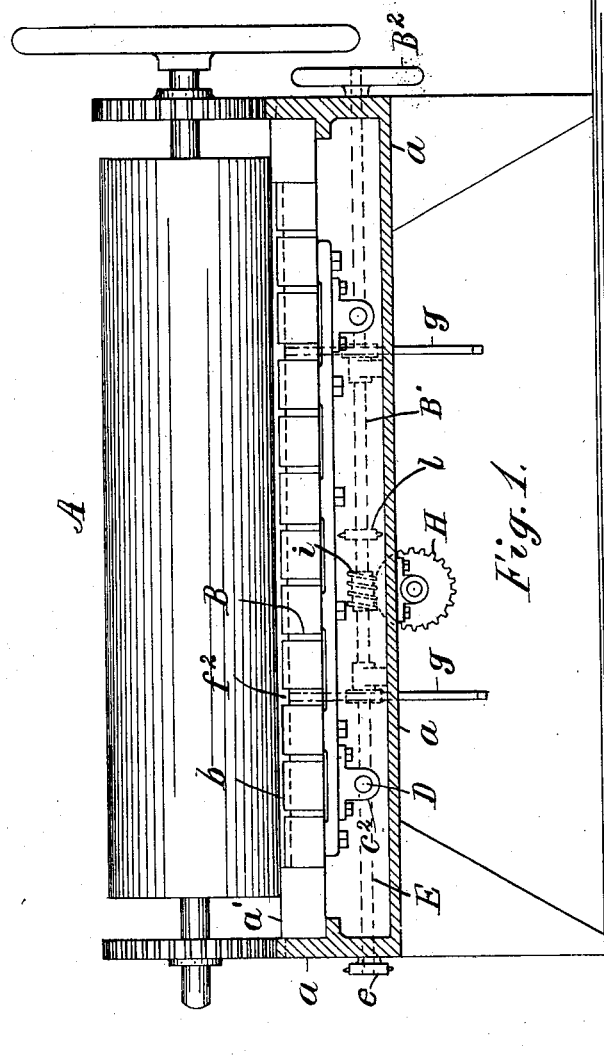
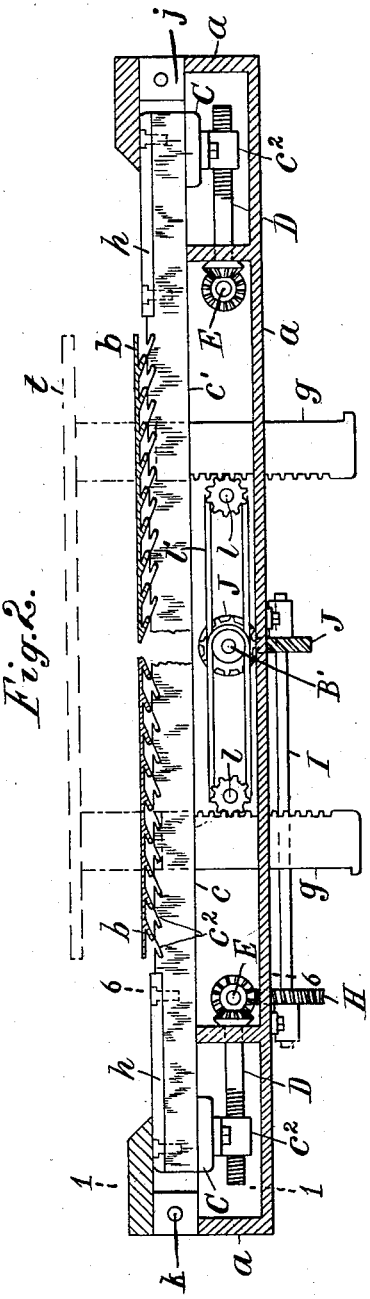
Attest:
L. Lee.
Arthur F. Heaton
Inventor.
Lawrence R. Blackmore, per
Thomas S. Crane, Atty.

No. 734,216. PATENTED JULY 21, 1903.
L. R. BLACKMORE.
APPARATUS FOR MOLDING GLASS TILES.
APPLICATION FILED MAR. 16, 1903.
NO MODEL. 3 SHEETS—SHEET 2.

Attest:
L. Lee.
Arthur T. Heald

Inventor.
Lawrence R. Blackmore, pe
Thomas S. Crane, Atty.

No. 734,216. PATENTED JULY 21, 1903.
L. R. BLACKMORE.
APPARATUS FOR MOLDING GLASS TILES.
APPLICATION FILED MAR. 16, 1903.
NO MODEL. 3 SHEETS—SHEET 3.
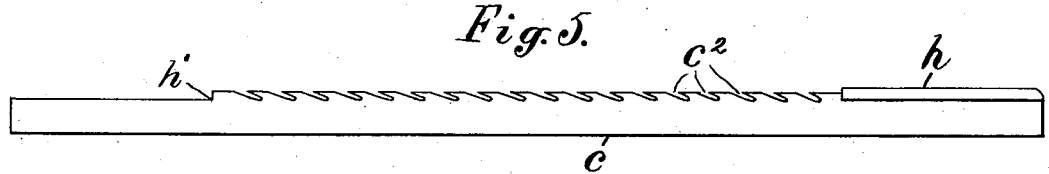
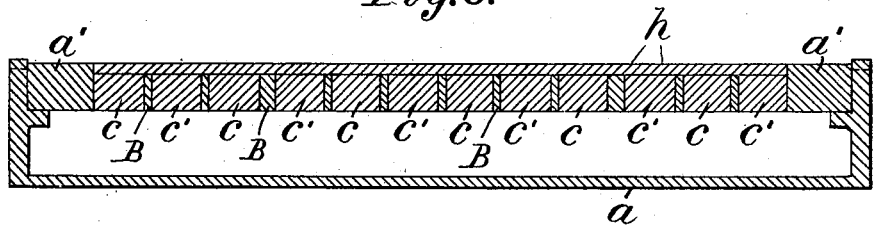
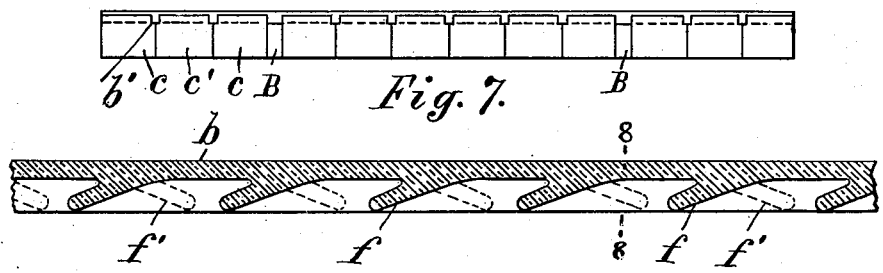
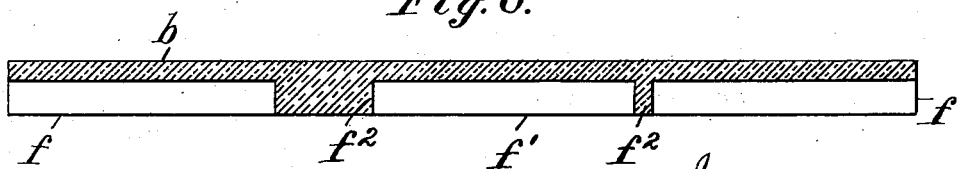

No. 734,216. Patented July 21, 1903.

UNITED STATES PATENT OFFICE.

LAWRENCE R. BLACKMORE, OF ARLINGTON, NEW JERSEY.

APPARATUS FOR MOLDING GLASS TILES.

SPECIFICATION forming part of Letters Patent No. 734,216, dated July 21, 1903.

Application filed March 16, 1903. Serial No. 147,912. (No model.)

*To all whom it may concern:*

Be it known that I, LAWRENCE R. BLACKMORE, a citizen of the United States, residing at 101 Pleasant Place, Arlington, county of Hudson, State of New Jersey, have invented certain new and useful Improvements in Apparatus for Molding Glass Tiles, fully described and represented in the following specification and the accompanying drawings, forming a part of the same.

The object of this invention is to furnish a means of molding large glass-tile plates with inclined projections upon the back intersected transversely by straight ribs molded integral with the inclined projections and adapted to strengthen the tile-plate in a direction where it is relatively weak by reason of the indentations between the inclined projections. The projections may be inclined all in one direction or in reverse directions, the reversely-inclined projections serving when used to absolutely prevent the displacement of the tile from the cement.

The mechanism includes a series of parallel bars in the bottom of the mold having transverse sloping notches upon the surfaces of the bars and means for moving the bars longitudinally while the tile-plate is permitted to rise vertically at right angles to the movement of the bars. Where transverse projections or ribs are required upon the tile-plate, the bars are formed alternately with notches inclined in transverse directions and are moved simultaneously in reverse directions when the tile-plate is molded to clear both sides of inclined notches from the plate simultaneously.

With this apparatus a tile-plate four feet wide and six feet long can be readily molded and then cut into tiles of any suitable size for convenient use, the straight strengthening-ribs being preferably disposed upon the tile-plate to form a part of each of the tiles into which it is cut. Lifters are extended through the mold to lift the tile bodily into a position where it may be grasped and removed.

The invention will be understood by reference to the annexed drawings, in which—

Figure 4:
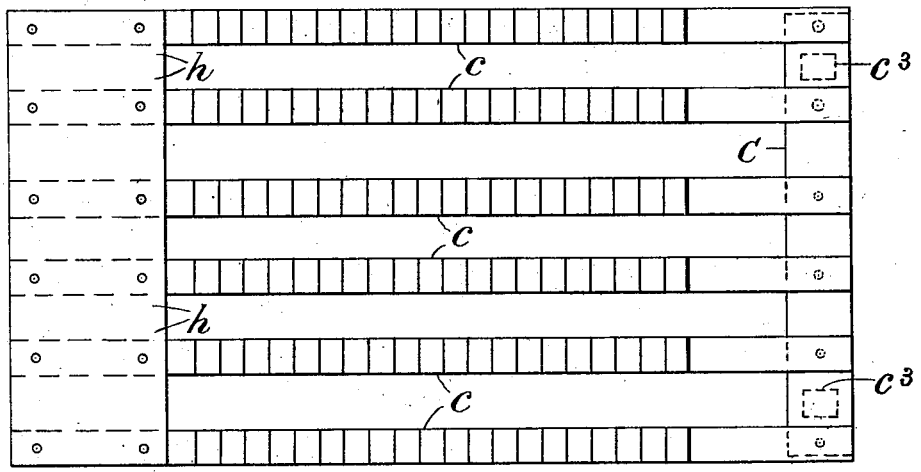

Figure 1 is a cross-section of the machine on line 1 1 in Fig. 2. Fig. 2 is a longitudinal section of the machine, the halves of the view at opposite sides of the center line being taken at the faces of two adjacent bars having the notches inclined in reverse directions. Fig. 3 is a plan of the bed, showing the rigid strips B, forming channels $b'$ for the removable bars. Fig. 4 is a plan of one set or series of bars. Fig. 5 is a side view of one of the bars $c$, and Fig. 6 a cross-section of the bed and bars at line 6 6 in Fig. 2. Fig. 6$^a$ is a cross-section of the bars with rabbets in their corners to form longitudinal ribs upon the tile-plate without the use of the strips B. Fig. 7 is a longitudinal section of portion of the tile-plate with dotted lines, showing reversely-inclined ribs in the rear; and Fig. 8 is a cross-section on line 8 8 in Fig. 7.

Hand mechanism for operating the bars and lifters is shown; but the nature of such mechanism may be changed as well as the form of the bed and supporting parts. Figs. 2, 3, and 4 illustrate mechanism for connecting the bars in two series and moving them in opposite directions, as when they are reversely notched.

In the figures, $a$ designates a plate forming the base of the bed, which bed is provided with ledges $a'$ at the sides to support the molding-roll A. Strips B are extended lengthwise of the bed and tied at their ends by blocks $j$ and bolts $k$. The alternate series of transversely-notched bars $c$ and $c'$ are fitted movably to the channels $b'$ between the strips, the tops of the bars lying sufficiently below the ledges $a'$ to determine the thickness of the tile-plate. The notches $c^2$ being reversely inclined form adjacent rows of ribs upon the under side of the tile-plate $b$, with the ribs $f$ $f'$ inclined reversely in opposite directions, as shown in Fig. 5. The alternate bars are transversely notched, as shown in Fig. 2, which exhibits parts of two adjacent bars, and the tops of the strips B are set level with the bottoms of the notches, so as to form between the sides of the bars grooves in which longitudinal ribs $f^2$ are formed upon the tile-plate, as shown in Fig. 8, uniting the contiguous ends of the inclined ribs $f f'$.

The bars $c$ are all united at one end by a tie-piece C, and a nut $c^2$ near each end of such tie-piece is provided with a screw D, which is connected by gearing with a hand-shaft E and hand-wheel E', and the turning of such shaft moves all the bars c simultaneously. The same construction at the opposite end of the tie-bars c' serves to move them simultaneously, and any suitable gearing, as sprocket-wheels e, connected by a chain e', serves to connect the shafts E and move all of the bars at the same time. Such movement operates to draw the notches in one set of bars from one set of the inclined ribs upon the tile-plate, while the plate is held from longitudinal movement by the simultaneous operation of the other notches upon the oppositely-inclined set of ribs, the plate being thus raised vertically, as indicated by the tile-plate b in Fig. 2.

Two of the strips B are shown of sufficient thickness to insert flat lifters g through the same, the lifters being connected by shafts l and gearing l', as shown in Figs. 2 and 3, so as to lift them all simultaneously when the tile-plate has been cleared from the bars and raise the plate, as indicated by the dotted lines t, sufficiently for a forked carrier to be inserted beneath the same to remove it. The extra thickness of the strips through which the lifters are formed produces an extra thickness in the adjacent longitudinal ribs $f^2$, (see Fig. 8,) and the lifters contact with such extra-thick ribs as they rise through the bed to lift the tile-plate therefrom. The extra thickness of the ribs is very advantageous in supporting the tile-plate upon four or more points, such as may be provided by the lifters shown. The gearing for the lifters is shown provided with a hand-shaft B', which may be turned, like the shaft E in Fig. 2, by a hand-wheel $B^2$. The shaft h is also shown connected by spiral gears J with a shaft I, provided with a worm-wheel H adjacent to one of the shafts E. A worm i is fitted to the shaft E to mesh with the worm H at pleasure and is fitted to a feather upon the shaft and provided with a shifter k', by which it may be disengaged from the worm-wheel. The object of these connections is to permit the simultaneous movement of the notched bars c c' and the lifters, so that in case a plate is of too great weight to be supported solely upon the ribs f f' it may be simultaneously lifted by a regulated movement of the lifters g, which support the plate by contact with the wide ribs $f^2$. When the lifters and the screws d are thus connected, they may all be actuated by either the hand-wheel E' or the hand-wheel $B^2$; but when the tile-plate is lifted clear of the bars c the worm may be disengaged from the worm-wheel H and the lifters then actuated much more rapidly by the hand-wheel $B^2$ to the position shown at t in Fig. 2, where the tile-plate can be easily removed.

To form a ledge at each end of the mold, the bars are connected by a plate h, (see Figs. 4, 5, and 6,) which is bolted to the bars and under which the ends of the alternate bars slide, being rabbeted for the purpose, as shown at h' in Fig. 5. The ledges formed by the plates h are drawn apart, as shown in Fig. 2, when discharging the tile-plate from the mold, and therefore clear the ends of the tile-plate completely. The side ledges a', Figs. 1 and 6, are fixed permanently to the frame.

It will be readily understood that all of the bars may be notched in the same direction—as, for instance, like the bar shown in Fig. 5—and the ledge or plate h at one end of the bar would then be held stationary and the rabbeted portion h' of the bars slip underneath the same when the bars were moved to discharge the tile-plate. In such case all the ribs upon the tile would be inclined in one direction, like the ribs f in Fig. 7, and they would be united at intervals and the portion b of the tile-plate strengthened by the straight longitudinal ribs $f^2$. By this apparatus a plate may therefore be made having inclined ribs (whether inclined reversely or all in one direction) intersected and united at intervals by integral straight ribs at right angles to the inclined ribs. Where the straight ribs desired by the tile-plate are quite thin, the use of the strips B upon the bed is undesirable, and the bars c c' may be made to contact with one another, as shown in Fig. $6^a$, and the grooves b to form the straight ribs may be produced by rabbeting the adjacent upper corners of the bars c c' to the depth of the notches $c^2$. Fig. $6^a$ shows all of the bars B thus eliminated, excepting the bars which guide the lifters in their upward movement, and two of such bars are shown for that purpose.

The apparatus can be operated with great rapidity, and the tile-plate may be made of such size as to greatly reduce the cost of manufacture. The tiles cut from such tile-plates may be used for wall and ceiling facing for buildings, railway-tunnels, subways, and any place where dampness is found or where hygienic principles must be carried into the greatest possible effect.

Having thus set forth the nature of the invention, what is claimed herein is—

1. In a machine for molding tiles having rows of reversely-inclined ribs, a mold having in the bottom adjacent bars with notches reversely inclined therein, and means for moving the bars in opposite directions to clear the ribs formed upon the tile-plate by the notches.

2. In a machine for molding tiles having rows of reversely-inclined ribs, a mold having in the bottom adjacent bars with notches reversely inclined therein, and a groove between the bars to form when the tile is molded a straight rib connecting the adjacent series of inclined ribs.

3. In a machine for molding tiles having rows of reversely-inclined ribs, a bed having longitudinal rigid strips with intermediate channels, bars fitted movably to the channels, and provided upon the top with transverse notches inclined respectively in opposite directions, ledges at the margin of the bed above the level of the strips and bars to form a mold, and means for moving the bars in opposite directions to discharge the tile from the mold.

4. In a machine for molding tiles having rows of reversely-inclined ribs, a mold having in the bottom movable bars provided upon their upper surface with transverse notches reversely inclined in alternate bars, ledges at the margin of the bed to form with the bars a tile-mold, means for connecting the alternate bars together and means for moving the two series of connected bars simultaneously in opposite directions to clear the ribs formed upon the tile by the notches.

5. In a machine for molding tiles having rows of reversely-inclined ribs, a mold having in the bottom movable bars provided upon their upper surface with transverse notches reversely inclined in alternate bars, ledges to form with the bars a tile-mold, tie-pieces connecting the alternate bars together and a nut and screw applied to each tie-piece to move the two series of bars simultaneously in opposite directions.

6. In a machine for molding tiles having rows of reversely-inclined ribs, a bed having longitudinal rigid strips with intermediate channels, two series of bars fitted respectively to the alternate channels and provided upon the top with transverse notches inclined respectively in opposite directions, ledges above the strips and bars to form a mold, and a roll to run over the ledges for pressing the glass in the mold.

7. In a machine for molding tiles having rows of reversely-inclined ribs, a bed having longitudinal rigid strips with intermediate channels, two series of bars fitted respectively to the alternate channels and provided upon the top with transverse notches inclined respectively in opposite directions, ledges above the strips and bars to form a mold, and a roll to run over the ledges for pressing the glass in the mold, and lifters movable vertically through the mold to lift the tile-plate from the mold when the ribs are cleared from the notches in the bars.

8. In a machine for molding tiles having adjacent rows of inclined ribs, a mold having in the bottom adjacent bars with inclined notches therein, and grooves between the several bars extended to the bottoms of the notches to form when the tile is molded straight ribs connecting the inclined ribs formed upon the several bars.

9. In a machine for molding tiles having rows of inclined ribs, a mold having in the bottom movable bars with inclined notches therein, lifters movable vertically through the mold between the bars, means for moving the bars longitudinally, and means connected therewith for moving at the same time the lifters vertically.

10. In a machine for molding tiles with rows of inclined ribs, a mold having in the bottom movable bars provided with inclined transverse notches, and rabbets between the adjacent corners of the bars extended to the bottoms of the notches to form straight ribs upon the tile-plate connecting rows of transverse ribs.

In testimony whereof I have hereunto set my hand in the presence of two subscribing witnesses.

LAWRENCE R. BLACKMORE.

Witnesses:
L. LEE,
THOMAS S. CRANE.